United States Patent
Jeong et al.

(10) Patent No.: US 11,230,640 B2
(45) Date of Patent: Jan. 25, 2022

(54) HYDROGEL FOR PRODUCING CLAY, PRODUCTION METHOD THEREOF, AND CLAY COMPRISING THE SAME

(71) Applicant: DAEGU GYEONGBUK INSTITUTE OF SCIENCE AND TECHNOLOGY, Daegu (KR)

(72) Inventors: Sang Won Jeong, Daegu (KR); Hyun-Chul Kim, Daegu (KR); Seong Jun Lee, Daegu (KR); Se Geun Lee, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 0 days.

(21) Appl. No.: 16/250,901

(22) Filed: Jan. 17, 2019

(65) Prior Publication Data
US 2019/0218387 A1   Jul. 18, 2019

(30) Foreign Application Priority Data
Jan. 17, 2018  (KR) .................. 10-2018-0005967

(51) Int. Cl.
| | |
|---|---|
| *C08L 33/02* | (2006.01) |
| *C08L 47/00* | (2006.01) |
| *B01J 13/00* | (2006.01) |
| *A63H 33/00* | (2006.01) |

(52) U.S. Cl.
CPC ............ *C08L 33/02* (2013.01); *B01J 13/0052* (2013.01); *B01J 13/0065* (2013.01); *C08L 47/00* (2013.01); *A63H 33/001* (2013.01); *C08L 2205/025* (2013.01); *C08L 2205/03* (2013.01); *C08L 2205/035* (2013.01)

(58) Field of Classification Search
CPC .............................. B01J 13/0052; C08L 33/02
See application file for complete search history.

(56) References Cited

FOREIGN PATENT DOCUMENTS

| KR | 10-2012-0048724 A | 5/2012 |
| KR | 10-1443402 B1 | 10/2014 |
| KR | 20150077495 A * | 7/2015 |

OTHER PUBLICATIONS

Machine translation of KR20120048724A. (Year: 2012).*
Machine translation of KR-20150077495-A (Year: 2015).*

* cited by examiner

*Primary Examiner* — Wenwen Cai
(74) *Attorney, Agent, or Firm* — Hauptman Ham, LLP

(57) ABSTRACT

A hydrogel includes: a partially or fully ionized cationic polymer and at least one selected from the group consisting of a partially or fully ionized anionic polymer and a low molecular weight compound having two or more anionic groups; or a partially or fully ionized anionic polymer and at least one selected from the group consisting of a partially or fully ionized cationic polymer and a low molecular weight compound having two or more cationic groups; and water. The hydrogel can be used for for producing clay with viscoelastic properties.

16 Claims, No Drawings

HYDROGEL FOR PRODUCING CLAY, PRODUCTION METHOD THEREOF, AND CLAY COMPRISING THE SAME

CROSS-REFERENCE TO RELATED APPLICATIONS

This application claims priority under 35 U.S.C. § 119 to Korean Patent Application No. 10-2018-0005967, filed on Jan. 17, 2018, in the Korean Intellectual Property Office, the disclosure of which is incorporated herein by reference in its entirety.

TECHNICAL FIELD

The following disclosure relates to a hydrogel for producing clay, a production method thereof, and clay including the same.

BACKGROUND

As children's playgrounds have been built indoors in recent years, there is an increasing demand for children's play clay, modeling clay, and the like that are artificially produced to have similar properties to natural clay.

The children's play clay is required to maintain excellent viscoelastic properties even though stretching and shrinking are continuously repeated, to suppress contamination by bacteria and other contaminants since the play clay is handled by children, and to have biocompatibility and no toxicity. Korean Patent Publication No. 1443402 discloses a material composition for children's play clay.

SUMMARY

An embodiment of the present invention is directed to providing a hydrogel for producing clay which does not include a boron-containing compound to have no toxicity while having excellent biocompatibility and excellent viscoelastic properties, a production method thereof, and clay including the same.

In one general aspect, a hydrogel for producing clay with viscoelastic properties includes: a partially or fully ionized cationic polymer and at least one selected from the group consisting of a partially or fully ionized anionic polymer and a low molecular weight compound having two or more anionic groups; or a partially or fully ionized anionic polymer and at least one selected from the group consisting of a partially or fully ionized cationic polymer and a low molecular weight compound having two or more cationic groups; and water.

The cationic polymer and at least one selected from the group consisting of the anionic polymer and the low molecular weight compound having two or more anionic groups; or the anionic polymer and at least one selected from the group consisting of the cationic polymer and the low molecular weight compound having two or more cationic groups; may form a polyion complex with each other to include one or more physical cross-linking points.

A part of a chain of the cationic polymer or the anionic polymer may not form the polyion complex.

The part of the chain of the cationic polymer or the anionic polymer that does not form the polyion complex may be ionic or non-ionic.

The total number of moles of the cationic groups and the total number of moles of the anionic groups of the components constituting the hydrogel may be different.

The hydrogel for producing clay may satisfy the following Equation 1:

$$5:95 \leq M_A : M_B \leq 95:5 \qquad \text{[Equation 1]}$$

in Equation 1, $M_A$ and $M_B$ are the number of moles of anionic groups and cationic groups, respectively, on the basis that the total number of moles of the cationic groups and the anionic groups is 100.

The hydrogel may further include a non-ionic polymer.

The cationic polymer or the low molecular weight compound having two or more cationic groups may include one or more of an amine salt, a phosphorus salt, a sulfur salt, or a metal complex compound.

The anionic polymer or the low molecular weight compound having two or more anionic groups may include one or more of carboxylate, sulfonate, sulfate, phosphate, or phosphonate.

The partially or fully ionized cationic polymer and at least one selected from the group consisting of the partially or fully ionized anionic polymer and the low molecular weight compound having two or more anionic groups; or the partially or fully ionized anionic polymer and at least one selected from the group consisting of the partially or fully ionized cationic polymer and the low molecular weight compound having two or more cationic groups; may have a content of 5 wt % to 95 wt % based on 100 wt % in total of the hydrogel.

The cationic polymer and the anionic polymer may each independently have a molecular weight of 5 kDa to 1000 kDa.

In another general aspect, there is provided a method for producing the hydrogel for producing clay described above.

In still another general aspect, there is provided clay including the hydrogel for producing clay described above and a particulate material.

DETAILED DESCRIPTION OF EMBODIMENTS

Unless otherwise defined, all terms (including technical and scientific terms) used in the present specification may be used with meanings that are commonly understandable by those skilled in the art to which the present invention pertains. Throughout the present specification, unless explicitly described to the contrary, "comprising" any components will be understood to imply further inclusion of other elements rather than the exclusion of any other elements. Unless explicitly described to the contrary, a singular form also includes a plural form in the present specification.

As an example of children's play clay, a material composition includes a hydroxyl-terminated polymer chemically cross-linked by a boron-containing compound.

However, it has been concluded that the boron-containing compound is currently classified as toxic to genital organs in the European Union and may have adverse effects on human health, and thus the boron-containing compound is now subject to regulation.

Therefore, there is a need to develop a material for producing clay having excellent viscoelastic properties, non-toxicity, and excellent biocompatibility.

An embodiment of the present invention provides a hydrogel for producing clay that does not include a boron-containing compound, specifically, a hydrogel for producing clay with viscoelastic properties including: a partially or fully ionized cationic polymer and at least one selected from the group consisting of a partially or fully ionized anionic polymer and a low molecular weight compound having two or more anionic groups; or a partially or fully ionized anionic polymer and at least one selected from the group consisting of a partially or fully ionized cationic polymer and a low molecular weight compound having two or more cationic groups; and water.

The hydrogel for producing clay according to an embodiment of the present invention is capable of forming a hydrogel without including a boron-containing compound. Since the hydrogel according to embodiments of the present invention has no toxicity and has excellent biocompatibility, the hydrogel may be suitable for production of children's play clay and may replace hydrogel including a boron-containing compound.

Specifically, in the hydrogel for producing clay according to an embodiment of the present invention, the cationic polymer and at least one selected from the group consisting of the anionic polymer and the low molecular weight compound having two or more anionic groups; or the anionic polymer and at least one selected from the group consisting of the cationic polymer and the low molecular weight compound having two or more cationic groups; form a polyion complex with each other to include one or more physical cross-linking points. In other words, the hydrogel may include a local physical cross-linking point formed according to electrostatic attraction between the cationic group and the anionic group of the cationic polymer and the anionic polymer or the low molecular weight compound having two or more anionic groups, or the cationic group and the anionic group of the anionic polymer and the cationic polymer or the low molecular weight compound having two or more cationic groups, and thus it is possible to impart viscoelastic properties to the hydrogel through the physical cross-linking point.

More specifically, the number of the physical cross-linking points may be two or more. It is preferable to include two or more physical cross-linking points since a plurality of cross-linking points to which the viscoelastic properties are imparted in the hydrogel may be present to further improve viscoelastic properties.

Accordingly, the hydrogel for producing clay according to an embodiment of the present invention may have excellent viscoelastic properties by including the physical cross-linking point, and may be mixed with a particulate material such as sand or the like, to produce clay having excellent viscoelastic properties.

As compared to hydrogel that forms a chemical cross-linking structure by a cross-linking agent or a boron-containing compound capable of forming a covalent bond, the hydrogel for producing clay according to an embodiment of the present invention implements viscoelastic properties through the physical cross-linking point without using the cross-linking agent, which is one of the factors that differentiates the hydrogel for producing clay according to an embodiment of the present invention from the other hydrogel. Through this factor, it is possible to obtain a hydrogel having high biocompatibility and no toxicity.

Further, in the hydrogel for producing clay according to an embodiment of the present invention, a part of a chain of the cationic polymer or the anionic polymer may not form an ionic complex (polyion complex) by electrostatic attraction.

In other words, the hydrogel for producing clay according to an embodiment of the present invention may include a portion that does not form the physical cross-linking point in the cationic polymer chain or the anionic polymer chain, together with the physical cross-linking point according to an electrostatic attraction between the ionized cationic group of the cationic polymer and the anionic group of the anionic polymer or the low molecular weight compound having two or more anionic groups, or the physical cross-linking point according to an electrostatic attraction between the ionized anionic group of the anionic polymer and the cationic group of the cationic polymer or the low molecular weight compound having two or more cationic groups.

The portion not forming the polyion complex may be ionic or nonionic. As an example, in one anionic polymer chain, there may be a portion forming the polyion complex and a portion existing in a state of being dissolved or swollen in water without forming the polyion complex. As a result, the portion forming the polyion complex forms a physical cross-linking point insoluble in water and the portion not forming the polyion complex becomes a hydrated polymer chain, and thus the hydrogel has a physical cross-linking point, and simultaneously exhibits viscoelastic properties through the hydrated polymer chain.

In addition, the portion that does not form the physical cross-linking point may be water-soluble to thereby be hydrated, thereby forming a hydrogel.

Upon more specifically explaining a case where the cationic polymer and the anionic polymer are included with respect to this embodiment as an example, when the total number of moles of the ionized cationic groups and the ionized anionic groups of the cationic polymer and the anionic polymer are the same as each other, all of the ionic groups may contribute to formation of physical cross-linking point, and the remaining non-ionic portion may be a portion that does not form the polyion complex. More specifically, when at least one of the cationic polymer and the anionic polymer includes a non-ionic repeating unit or a non-ionic polymer chain (segment) having a predetermined length, if the total number of moles of the cationic groups and the total number of moles of the anionic groups are the same as each other, all ionic groups may form the polyion complex to form the physical cross-linking points that are insoluble in water, and the non-ionic polymer chain (segment) that is not capable of forming the polyion complex may be hydrated to exhibit viscoelastic properties.

Further, when the number of moles of the cationic groups and the number of moles of the anionic groups are the same as each other, some of the ionic groups may contribute to the formation of the physical cross-linking point, and some ionic groups and non-ionic portions may become a portion that does not form the polyion complex.

This embodiment is illustrative, and the present invention is not necessarily limited thereto. Various embodiments capable of forming a hydrogel while forming the physical cross-linking point such as an embodiment including the cationic polymer and the low molecular weight compound having two or more anionic groups, an embodiment including the anionic polymer and the low molecular weight compound having two or more cationic groups, and the like may be included in the scope of the present invention.

In another embodiment, in the hydrogel for producing clay according to an embodiment of the present invention, the total number of moles of the ionized cationic groups of the cationic polymer and the total number of moles of the ionized anionic groups of the anionic polymer may be different.

When the total number of moles of the ionized cationic groups and the anionic groups are the same and all of the ionic groups contribute to the formation of physical cross-linking points, hydration is not achieved due to perfect charge matching, or viscosity of the hydrogel is significantly lowered, and thus the corresponding hydrogel may not be usable as a hydrogel for clay.

However, when the total number of moles of ionized cationic groups of the cationic polymer and the total number of moles of ionized anionic groups of the anionic polymer are different, it is possible to easily produce a hydrogel and implement excellent viscoelastic properties as compared to a case where the total number of moles of ionized cationic groups of the cationic polymer and the total number of moles of ionized anionic groups of the anionic polymer are the same. As an example, when both the cationic polymer and the anionic polymer, respectively, are substantially formed of ionic repeating units only, and the total number of moles of the cationic groups and the total number of moles of the anionic groups are the same, all of the respective ionic repeating units form the polyion complex, thus resulting in very high concentration of the physical cross-linking point. Thus, the polymer chain that is capable of being hydrated is substantially not present, and the hydrogel may not exhibit viscosity or may exhibit remarkably lowered viscosity. However, when the total number of moles of the cationic groups and the total number of moles of the anionic groups are different, i.e., a mismatch of ionic groups may be induced, all ionic polymers having a smaller total number of moles of the ionic groups form the polyion complex, and a polymer chain of a portion in which the polyion complex is not formed in any one ionic polymer having a larger total number of moles of the ionic groups may be hydrated to generally exhibit viscoelastic properties.

Thus, the case where the total number of moles of the cationic groups of the cationic polymer and the total number of moles of the anionic groups of the anionic polymer are different may be relatively preferable in the hydrogel for producing clay according to an embodiment of the present invention.

Upon explaining a more specific example of this case as an example, the cationic group of the cationic polymer and the anionic group of the anionic polymer contribute to the formation of the physical cross-linking point depending on the contained equivalent, and the remaining residual cationic group or anionic group and the non-ionic group that may be optionally included may not form the physical cross-linking point.

This embodiment is also illustrative, and the present invention is not necessarily limited thereto. The present invention may be implemented in the same manner as in the case of including the cationic polymer and the low molecular weight compound having two or more anionic groups or the case of including the anionic polymer and the low molecular weight compound having two or more cationic groups, or the like.

More specifically, this embodiment may satisfy the following Equation 1. However, the present invention is not necessarily limited thereto.

$$5:95 < M_A:M_B < 95:5 \quad \text{[Equation 1]}$$

in Equation 1, $M_A$ and $M_B$ are the number of moles of ionized anionic groups and ionized cationic groups, respectively, on the basis that the total number of moles of the cationic groups and the anionic groups of the components constituting the hydrogel according to embodiments of the present invention is 100.

Within this range, it is possible to produce a hydrogel having excellent viscoelastic properties, and it is possible to produce clay having excellent viscoelastic properties by mixing the produced hydrogel with a particulate material such as sand, or the like, as confirmed by Examples described below.

More specifically, the Equation 1 above may satisfy $20:80 \leq M_A:M_B \leq 80:20$, or $30:70 \leq M_A:M_B \leq 70:30$, and more specifically, $40:60 \leq M_A:M_B \leq 60:40$, or $45:55 \leq M_A:M_B \leq 55:45$. These ranges are preferable since it is possible to implement relatively better viscoelastic properties, but is not necessarily limited thereto.

The partially or fully ionized cationic polymer and at least one selected from the group consisting of the partially or fully ionized anionic polymer and the low molecular weight compound having two or more anionic groups; or the partially or fully ionized anionic polymer and at least one selected from the group consisting of the partially or fully ionized cationic polymer and the low molecular weight compound having two or more cationic groups; may have a content of 5 wt % to 95 wt % based on 100 wt % in total of the hydrogel. Meanwhile, the present invention is not limited thereto, and more specific examples thereof may be 10 wt % to 90 wt % or 30 wt % to 70 wt %.

The cationic polymer and the low molecular weight compound having two or more cationic groups may be employed without limitation as long as the low molecular weight compound includes a functional group that is capable of being cationized. Specific examples thereof may include one or more of an amine salt, a phosphorus salt, a sulfur salt, or a metal complex compound.

Specifically, ammonium ($NR_4^+$), sulfonium ($SR_3^+$), or phosphonium ($PR_4^+$) may be included, wherein R may be a substituted or unsubstituted hydrocarbon group such as alkyl, cycloalkyl, heterocycloalkyl, aralkyl, aryl, heteroaryl, alkylaryl, or the like, but is not limited to any particular form.

Specific examples of the cationic polymer may include a cationic polysaccharide, a cationic vinyl polymer, a cationic polypeptide, and the like. Non-limiting examples thereof may include chitosan, ammonium-substituted dextran, ammonium-substituted starch, polylysine, polyethyleneimine, polyamidoamine, poly(diallyldimethylammonium chloride), poly[(3-chloro-2-hydroxypropyl)methacryloxyethyldimethyl-ammonium chloride], poly(1-methyl-4-vinylpyridinium bromide), poly(methacryloxyethyltriethylammonium bromide), poly(2-methacryloxyethyldimethylsulfonium chloride), poly(diallyldiethylphosphonium chloride), poly((4-vinylbenzyl)tributylphosphonium chloride), and a copolymer thereof.

Further, the low molecular weight compound having two or more cationic groups may be a C1 to C4C cationic low molecular weight compound including a hetero element, and specifically an aliphatic, alicyclic, or aromatic cationic low molecular weight compound. Non-limiting examples may include ethylenediamine, phenylenediamine, bis(aminocyclohexyl)methane, norbornane diamine, and the like, but the present invention is not limited thereto.

The metal complex compound means that a metal ion present in the hydrogel is coordinated with water. In the environment where the anionic group described below is present, the anionic group may be substituted with water, and thus the metal complex compound may be substituted with a form in which the metal and the anionic group are coordinated to each other. The metal ion is a metal present in water and is not limited to a specific metal, and may be a metal ion generally present in water.

The anionic polymer and the low molecular weight compound having two or more anionic groups may be employed without limitation as long as they include a functional group that is capable of being anionized. Specific examples of the functional group may include one or more of carboxylate, sulfonate, sulfate, phosphate, and phosphonate.

Specific examples of the anionic polymer may include an anionic polysaccharide, an anionic vinyl-based polymer, an anionic polypeptide, and the like. Non-limiting examples thereof may include hyaluronic acid, chondroitin sulfate, arginic acid, cellulose sulfate, polyacrylic acid, poly methacrylic acid, poly(vinyl sulfonate), poly(sulfoethyl methacrylate), poly(acrylamidemethylpropyl sulfonate), polystylene sulfonate, poly glutamic acid, and a copolymer thereof.

Further, the low molecular weight compound having two or more anionic groups may be a C1 to C40 anionic low molecular weight compound including a hetero element, and specifically an aliphatic, alicyclic, or aromatic anionic low molecular weight compound. Non-limiting examples thereof may include tartaric acid, malic acid, citric acid, fumaric acid, succinic acid, ethylenediaminetetraacetic acid (EDTA), terephthalic acid, and the like, but the present invention is not limited thereto.

A molecular weight of the cationic polymer and a molecular weight of the anionic polymer may be each independently 5 kDa to 1000 kDa, and more specifically 10 kDa to 500 kDa, but the present invention is not limited thereto.

In addition, the molecular weight of the cationic polymer and the molecular weight of the anionic polymer may be different from each other. For example, an anionic polymer having a molecular weight of 100 kDa to 300 kDa and a cationic polymer having a molecular weight of 200 kDa to 500 kDa may be mixed.

Further, the hydrogel for producing clay according to an embodiment of the present invention may include two or more cationic polymers and two or more anionic polymers.

Here, a high molecular weight cationic polymer or a high molecular weight anionic polymer may be mixed with a low molecular weight cationic polymer or a low molecular weight anionic polymer, and the present invention is not limited to the specific embodiments. However, when the low molecular weight polymer is used, it is preferable to use the high molecular weight polymer on the other side. Here, the low molecular weight means that the molecular weight is, for example, 1 kDa to 50 kDa.

When the low molecular weight cationic polymer or the low molecular weight anionic polymer is used in combination, the used polymer may serve as a lubricant in the hydrogel to improve viscosity of the hydrogel. The high molecular weight cationic polymer or high molecular weight anionic polymer may improve elasticity to further improve viscoelastic properties.

The hydrogel for producing clay according to an embodiment of the present invention may further include a non-ionic polymer. When the non-ionic polymer is further included, similarly, it may be preferable since it is possible to implement relatively better viscoelastic properties, but the present invention is not necessarily limited thereto.

Non-limiting examples of the non-ionic polymer may include polyacrylamide, polyvinyl alcohol, polyethylene glycol, a polyethylene glycol-polypropylene glycol copolymer, and a copolymer thereof. In order to improve viscoelastic properties, polyacryl amide may be selected, but this is merely an example, and the present invention is not limited thereto.

When the hydrogel further includes the non-ionic polymer, a content of the non-ionic polymer may be 5 wt % to 30 wt % based on the total weight of the partially or fully ionized cationic polymer and at least one selected from the group consisting of the partially or fully ionized anionic polymer and the low molecular weight compound having two or more anionic groups; or the partially or fully ionized anionic polymer and at least one selected from the group consisting of the partially or fully ionized cationic polymer and the low molecular weight compound having two or more cationic groups; but the present invention is not limited thereto.

The molecular weight of the non-ionic polymer may be 400 kDa to 800 kDa, which is an example, and the present invention is not limited thereto.

In an embodiment of the present invention, there is provided a method for producing the hydrogel according to an embodiment of the present invention.

As a non-limiting example, the method for producing a hydrogel including a cationic polymer and an anionic polymer may include, for example, any one of the following steps a) to c):

a) mixing a cationic polymer and an ionizing agent thereof; a salt of anionic polymer; and water, b) mixing a salt of a cationic polymer; an anionic polymer and an ionizing agent thereof; and water, and c) mixing a salt of a cationic polymer; a salt of an anionic polymer; and water.

In other words, according to the method for producing a hydrogel for producing clay of an embodiment of the present invention, consequently, the hydrogel may be produced in any form in which the cationic polymer having a cationic group and the anionic polymer having an anionic group are mixed with each other, and the present invention is not limited to the specific embodiment.

The ionizing agent of the cationic polymer may be an acidic material, and may be employed without limitation among known materials as long as it is capable of cationizing the functional group of the cationic polymer.

Specific examples thereof may include hydrochloric acid, sulfuric acid, nitric acid, nitrous acid, and the like, but the present invention is not limited thereto.

The ionizing agent of the anionic polymer may be a basic material, and may be employed without limitation among known materials as long as it is capable of anionizing the functional group of the anionic polymer.

Specific examples thereof may include sodium hydroxide, potassium hydroxide, calcium hydroxide, barium hydroxide, and the like, but the present invention is not limited thereto.

The production method of an embodiment of the present invention is described below with reference to specific examples, but the present invention is not limited thereto.

First, an anionic polymer and water are mixed to prepare an aqueous solution. Next, the ionizing agent of the anionic polymer is mixed to ionize the functional group of the anionic polymer, and the salt of the cationic polymer is mixed.

As a result, it is possible to produce a hydrogel in which portions of the chains of the cationic polymer and the anionic polymer form the polyion complex to include physical cross-linking points.

In the production method of an embodiment of the present invention, in the mixing of the anionic polymer and water, the non-ionic polymer may be further mixed.

Further, two or more kinds of cationic polymers or anionic polymers having different molecular weights or different functional groups may also be employed.

The kinds of polymers and other physical characteristics to be considered in the production are the same as described above, and thus detailed descriptions thereof are omitted.

As a non-limiting example of a production method in which a low molecular weight compound having two or more cationic groups or anionic groups is used, it is possible to produce a hydrogel by mixing the cationic polymer or the anionic polymer with a low molecular weight compound having an opposite charge to the polymer employed therebetween.

Specifically, when a cationic polymer and a low molecular weight compound having two or more anionic groups are used, the production method may include any one of the following steps d) and e):

d) mixing a cationic polymer and an ionizing agent thereof; a low molecular weight compound having two or more anionic groups; and water, and e) mixing a salt of a cationic polymer; a low molecular weight compound having two or more anionic groups; and water.

In this embodiment, a non-ionic polymer may be further mixed when mixing the cationic polymer or the anionic polymer with a low molecular weight compound having two or more cationic groups or two or more anionic groups having an opposite charge to the polymer employed therebetween.

Further, two or more kinds of cationic polymers or anionic polymers having different molecular weights or different functional groups may also be employed.

Specific kinds of materials and other physical characteristics to be considered in the production are the same as described above, and thus detailed descriptions thereof are omitted.

An embodiment of the present invention may provide clay including the hydrogel for producing clay according to the embodiment of the present invention described above and a particulate material.

As described above, since the clay according to embodiments of the present invention does not include a boron-containing compound, the clay according to embodiments of the present invention may have excellent biocompatibility while having no toxicity to be capable of replacing existing children's play clay, and the like. Further, it is possible to implement excellent viscoelastic properties.

The particulate material may be an inorganic powder such as silica particles, sand, or the like, but is not limited thereto, and may be appropriately selected depending on the application.

Further, the particulate material may have a particle size of 0.02 to 0.5 mm, but the present invention is not limited thereto. Regarding a content ratio of the particulate material and the hydrogel, the particulate material may have a content of 1 to 98% by volume, more specifically 5 to 60% by volume based on 100% by volume in total of the particulate material and the hydrogel. The present invention is not limited thereto, and may be suitably adjusted without limitation depending on the purpose.

Hereinafter, Examples of the present invention are provided. However, the following Examples are only provided as embodiments of the present invention, and the present invention is not limited to the following Examples.

EXAMPLE 1

To an aqueous solution of 1.8 g of polyacrylic acid (molecular weight: 240 kDa) and 5.3 g of water, 10.0 g of 1N aqueous solution of NaOH was added and thoroughly mixed, and 7.0 g of a 20 wt % aqueous solution of poly (diallyldimethylammonium chloride) (molecular weight: 350 kDa) was added thereto and the mixture was thoroughly mixed. The obtained mixture was kneaded to remove some of water, thereby producing a viscoelastic hydrogel.

EXAMPLE 2

To an aqueous solution of 1.8 g of polyacrylic acid (molecular weight: 240 kDa), 0.2 g of poly(acrylamide) (molecular weight: 600 kDa), and 7.0 g of water, 10.0 g of 1N aqueous solution of NaOH was added and thoroughly mixed, and 7.0 g of a 20 wt % aqueous solution of poly (diallyldimethylammonium chloride) (molecular weight: 350 kDa) was added thereto and the mixture was thoroughly mixed. The mixture was kneaded to remove some of water, thereby producing a viscoelastic hydrogel.

EXAMPLE 3

To an aqueous solution of 1.8 g of polyacrylic acid (molecular weight: 240 kDa), 0.3 g of poly(methacrylic acid) sodium salt (molecular weight: 9.5 kDa), and 6.6 g of water, 0.3 g of NaCl was added and dissolved to increase the viscosity, and 7.0 g of a 20 wt % aqueous solution of poly(diallyldimethylammonium chloride) (molecular weight: 350 kDa) was added thereto and thoroughly mixed, thereby producing a viscoelastic hydrogel.

EXAMPLE 4

To an aqueous solution of 1.8 g of polyacrylic acid (molecular weight: 240 kDa) and 5.3 g of water, 3.3 g of a 1N aqueous solution of NaOH was added and thoroughly mixed, and 7.0 g of a 20 wt % aqueous solution of poly (diallyldimethylammonium chloride) (molecular weight: 350 kDa) was added thereto and thoroughly mixed. The mixture was kneaded to remove some of water, thereby producing a hydrogel having viscoelastic properties.

EXAMPLE 5

To an aqueous solution of 1.8 g of polyacrylic acid (molecular weight: 240 kDa) and 5.3 g of water, 16.7 g of a 1N aqueous solution of NaOH was added and thoroughly mixed, and 7.0 g of a 20 wt % aqueous solution of poly (diallyldimethylammonium chloride) (molecular weight: 350 kDa) was added thereto and thoroughly mixed. The mixture was kneaded to remove some of water, thereby producing a transparent viscoelastic hydrogel.

EXAMPLE 6

To an aqueous solution of 1.8 g of polyacrylic acid (molecular weight: 240 kDa) and 5.3 g of water, 10.0 g of a 1N aqueous solution of NaOH was added and thoroughly mixed, and 4.7 g of a 20 wt % aqueous solution of poly (diallyldimethylammonium chloride) (molecular weight: 350 kDa) was added thereto and thoroughly mixed. The mixture was kneaded to remove some of water, thereby producing a hydrogel having viscoelastic properties.

EXAMPLE 7

To an aqueous solution of 1.8 g of polyacrylic acid (molecular weight: 240 kDa) and 0.2 g of poly(acrylamide) (molecular weight: 600 kDa), 0.3 g of poly(methacrylic acid) sodium salt (molecular weight: 9.5 kDa), and 8.4 g of water, 0.3 g of NaCl was added and dissolved to increase the viscosity, and 7.0 g of a 20 wt % aqueous solution of poly(diallyldimethylammonium chloride) (molecular weight: 350 kDa) was added thereto to prepare a viscoelastic hydrogel having increased viscosity.

EXAMPLE 8

To an aqueous solution of 1.8 g of polyacrylic acid (molecular weight: 240 kDa) and 5.3 g of water, 10.0 g of 1N aqueous solution of NaOH was added and thoroughly mixed, and 0.58 g of ethylenediammonium dichloride was added thereto and thoroughly mixed. The obtained mixture was kneaded to remove some of water, thereby producing a viscoelastic hydrogel.

The total number of moles of the ionized anionic groups and the ionized cationic groups of each hydrogel produced in Examples 1 to 8, and each ratio of the number of moles of ionized anionic groups (MA) and the number of moles of ionized cationic groups (MB) on the basis that the total number of moles of the anionic groups and the cationic groups is 100 are summarized in Table 1 below.

TABLE 1

|  | Example 1 | Example 2 | Example 3 | Example 4 | Example 5 | Example 6 | Example 7 | Example 8 |
|---|---|---|---|---|---|---|---|---|
| The number of moles of ionized anionic groups | 0.01 | 0.01 | 0.0028 | 0.0033 | 0.0167 | 0.01 | 0.0028 | 0.01 |
| The number of moles of ionized cationic groups | 0.0087 | 0.0087 | 0.0087 | 0.0087 | 0.0087 | 0.0058 | 0.0087 | 0.0087 |
| $M_A:M_B$ | 53:47 | 53:47 | 24:76 | 28:72 | 66:34 | 63:37 | 24:76 | 53:47 |

EXAMPLE 9

After 1.0 g of each hydrogel produced in Examples 1 to 8 and 0.5 g of sand having an average particle size of 0.75 mm were mixed, the prepared composite composition was kneaded for 10 minutes, and whether or not the viscoelastic properties are maintained was confirmed by stretching the kneaded composite composition with both hands.

As a confirmation result, the viscoelastic properties remained excellent even when the stretching and shrinking were repeated in all of the Examples. In Example 1, Example 2, and Example 8 as better cases, the extent to which viscoelastic properties are maintained was relatively better until the stretching was repeated several times from the beginning.

Further, Example 2, in which polyacrylamide, which is a non-ionic polymer, was further mixed, exhibited relatively excellent viscoelastic properties as compared with Examples 1 and 8.

Accordingly, it is expected that the hydrogel of the present invention is applied to production of children's play clay and the like, and it is confirmed that it is possible to produce clay having excellent biocompatibility since the hydrogel according to embodiments of the present invention does not include the boron-containing compound.

The hydrogel of an embodiment of the present invention has excellent biocompatibility, no toxicity, and excellent viscoelastic properties since the hydrogel does not include a boron-containing compound, thereby providing a hydrogel suitable for play clay.

The hydrogel of an embodiment of the present invention may provide play clay having a viscoelastic properties and a texture similar to that of clay due to high compatibility with particulate materials such as sand and the like.

The hydrogel of an embodiment of the present invention does not involve a separate chemical reaction and does not use a toxic reactant to be capable of replacing existing clay materials such as play clay including a boron-containing compound and the like, which are objects to be regulated.

In addition, the hydrogel in an embodiment of the present invention has a simple production method to have high economic efficiency and to be advantageous for mass production.

What is claimed is:

1. A hydrogel for producing clay with viscoelastic properties comprising:
    ionic compounds;
    a non-ionic polymer; and
    water,
    wherein the ionic compounds comprise:
        a cationic polymer and an anionic compound having two or more anionic groups, wherein the cationic polymer comprises a plurality of repeating units each having a cationic group, which is at least partially ionized; or
        an anionic polymer and a cationic compound having two or more cationic groups, wherein the anionic polymer comprises a plurality of repeating units each having an anionic group, which is at least partially ionized,
    wherein the cationic polymer is one or more selected from the group consisting of a cationic vinyl polymer, a cationic polysaccaharide and a cationic polypeptide, and the anionic polymer is one or more selected from the group consisting of an anionic vinyl polymer, an anionic polysaccharide and an anionic polypeptide,
    wherein a total molarity of cationic groups and a total molarity of anionic groups in the ionic compounds are different, and
    wherein a molecular weight of the non-ionic polymer ranges from 400 kDa to 800 kDa.

2. The hydrogel of claim 1, wherein the cationic polymer and the anionic compound having two or more anionic groups; or the anionic polymer and the cationic compound having two or more cationic groups; form a polyion complex with each other to include one or more physical cross-linking points.

3. The hydrogel of claim 1, wherein a part of a chain of the cationic polymer or the anionic polymer does not form a polyion complex.

4. The hydrogel of claim 3, wherein the part of the chain of the cationic polymer or the anionic polymer that does not form the polyion complex is ionic or non-ionic.

5. The hydrogel of claim 1, wherein the hydrogel satisfies the following Equation 1:

$$5:95 \leq M_A:M_B \leq 95:5 \quad \text{[Equation 1]}$$

in Equation 1, $M_A$ and $M_B$ are the number of moles of anionic groups and cationic groups, respectively, on the basis that the total number of moles of the anionic groups and the cationic groups is 100.

6. The hydrogel of claim 1, wherein the cationic compound having two or more cationic groups includes one or more selected from the group consisting of an amine salt, a phosphorus salt, a sulfur salt, and a metal complex compound.

7. The hydrogel of claim 1, wherein the anionic compound having two or more anionic groups includes one or more selected from the group consisting of carboxylate, sulfonate, sulfate, phosphate, and phosphonate.

8. The hydrogel of claim 1, wherein an amount of a sum of the cationic polymer and the anionic compound having two or more anionic groups or an amount of a sum of the anionic polymer and the cationic compound having two or more cationic groups ranges from 5 wt % to 95 wt % based on the total weight of the hydrogel.

9. The hydrogel of claim 1, wherein the cationic polymer and the anionic polymer each independently have a molecular weight of 5 kDa to 1000 kDa.

10. The hydrogel of claim 1, wherein the anionic compound comprises the anionic polymer or another anionic polymer.

11. The hydrogel of claim 1, wherein the anionic compound comprises a non-polymeric compound having two or more anionic groups.

12. The hydrogel of claim 1, wherein the anionic compound comprises:
   the anionic polymer or another anionic polymer; and
   a non-polymeric compound having two or more anionic groups.

13. The hydrogel of claim 1, wherein the cationic compound comprises the cationic polymer or another cationic polymer.

14. The hydrogel of claim 1, wherein the cationic compound comprises a non-polymeric compound having two or more cationic groups.

15. The hydrogel of claim 1, wherein the cationic compound comprises:
   the cationic polymer or another cationic polymer; and
   a non-polymeric compound having two or more cationic groups.

16. A clay comprising the hydrogel for producing clay of claim 1, and a particulate material.

* * * * *